United States Patent [19]
Housel

[11] 3,724,907
[45] Apr. 3, 1973

[54] WHEEL HUB

[75] Inventor: John R. Housel, Cherryvale, Kans.

[73] Assignee: Hensel-Miller, Inc., Cherryvale, Kans.

[22] Filed: Feb. 17, 1971

[21] Appl. No.: 116,074

[52] U.S. Cl. .............................................301/105 R
[51] Int. Cl. ...............................................B60b 27/02
[58] Field of Search.301/105 R, 65, 6 A, 63 D, 36 R, 301/12 R; 308/15, 237, 210, 191, 211; 29/159.3

[56] References Cited

UNITED STATES PATENTS

| | | | |
|---|---|---|---|
| 1,812,338 | 6/1931 | Holt | 301/12 R |
| 2,407,749 | 9/1946 | Sinclair | 301/9 DN |
| 2,016,435 | 2/1972 | Isidin | 301/65 |
| 2,175,084 | 10/1939 | Lefere | 301/105 R X |
| 2,781,231 | 2/1957 | Black | 301/105 R |
| 1,959,754 | 5/1934 | Zipper | 301/65 |
| 2,822,218 | 2/1958 | Whitfield | 301/6 |

FOREIGN PATENTS OR APPLICATIONS

| | | | |
|---|---|---|---|
| 555,113 | 1/1957 | Italy | 301/65 |

Primary Examiner—Richard J. Johnson
Attorney—Bradley & Wharton

[57] ABSTRACT

A hub for mounting a wheel on an axle utilizes a steel sleeve for forming an axle bushing and a bearing housing. The steel sleeve is surrounded by an aluminum casting which forms the remainder of the hub and includes a circumscribing flange for securing a wheel. A plurality of openings in the hub flange receive lug bolts for fastening the wheel. The openings in the wheel hub are of polygonal configuration for receiving complementally configured shafts of the lug bolts to distribute torque between the wheel and the hub. The lug bolts are provided with relatively large heads and a socket is formed by the hub for receiving the head of each lug bolt. The socket is provided by a plurality of gusset plates which are integral with the hub flange and present a large surface area for contact with the bolt head to further maximize torque distribution between the wheel and hub.

3 Claims, 4 Drawing Figures

PATENTED APR 3 1973　　　　　　　　　　　　　　　　　3,724,907
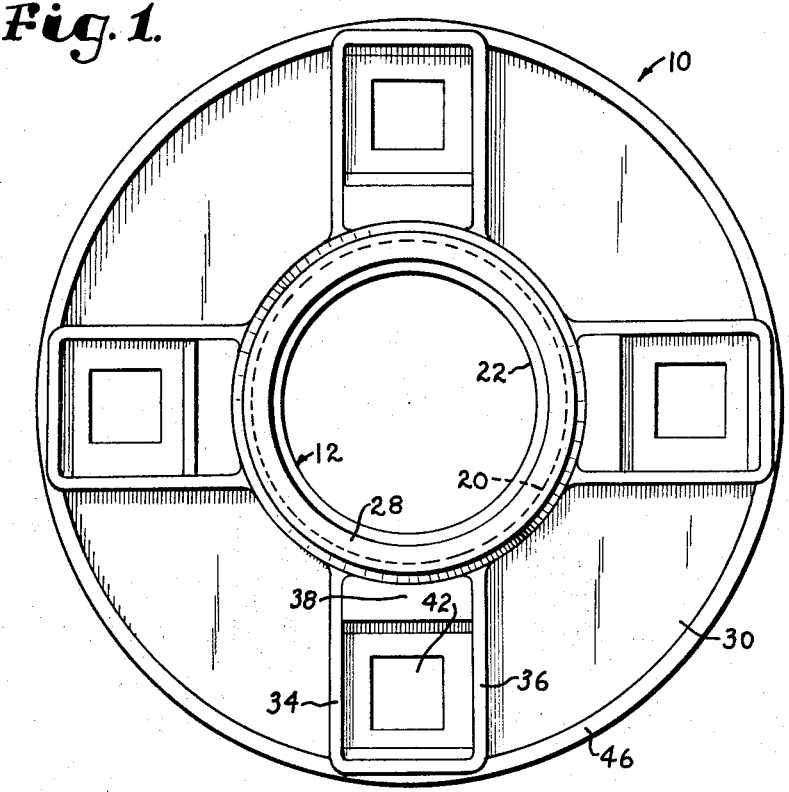
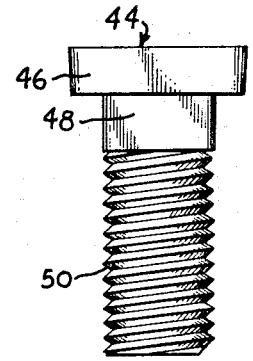
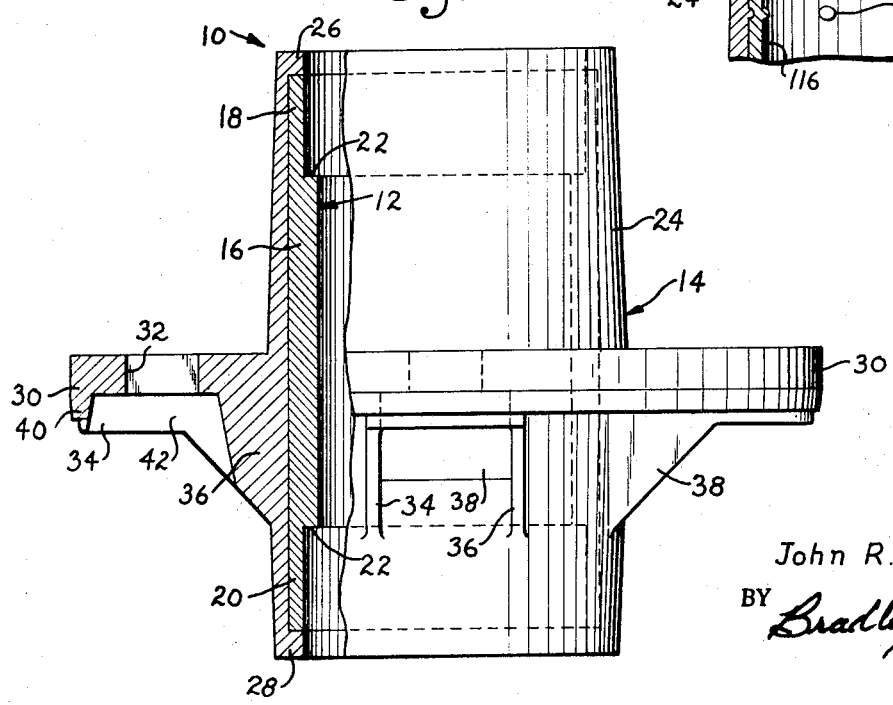
INVENTOR.
John R. Housel
BY Bradley and Wharton
ATTORNEYS

WHEEL HUB

This invention relates to improvements in the manufacture of wheel hubs.

When pneumatic wheels are utilized on a vehicle, it is the practice to provide a hub which is separate from the wheel and to which the wheel is secured. The hub is normally provided with bearings which contact the axle upon which the wheel and hub are mounted.

Because of the high strength requirements wheel hubs have heretofore been constructed from steel or a steel alloy. Aluminum is a much more desirable material because of its light weight and also because it has a much greater ability to dissipate heat than does steel. However, because of the lack of ability of aluminum to accommodate the torsional forces encountered during turning of a wheel, it has not previously been possible to construct an economical wheel hub of aluminum with strength comparable to that of steel.

The great increase in popularity of campers and boats has also created a need for a wheel hub which is more economical to manufacture than the more common steel hubs, but which does not sacrifice strength.

It is therefore an object of the present invention to provide a wheel hub which can be constructed from a light-weight material such as aluminum, yet which has a strength comparable to steel.

Another object of the invention is to provide a wheel hub constructed from aluminum wherein structure is included in the wheel hub for accommodating the torsional forces encountered when a wheel turns on an axle.

As a corollary to the foregoing object, an important aim of this invention is to provide a wheel hub constructed from a light-weight material such as aluminum which can accommodate steel lug bolts and has a large surface area in contact with the lug bolt heads to distribute torsional forces between a wheel and the hub over a large area.

Still another object of this invention is to provide a wheel hub which can utilize a steel insert to provide bearing housings and a bushing for an axle on which the wheel turns.

It is also one of the aims of this invention to provide a wheel hub having superior heat dissipation properties because of its construction from a material such as aluminum.

This invention also has as one of its objects the provision of a wheel hub constructed from a light-weight material such as aluminum wherein the wheel hub can accommodate steel lug bolts and the construction of the hub allows the bolts to be permanently secured thereto without damage to the relatively soft aluminum by the relatively hard steel.

Still another important aim of this invention is to provide a wheel hub which can be constructed utilizing relatively economical die casting techniques.

In the drawings:

FIG. 1 is a side elevational view of a wheel hub constructed according to the teachings of the present invention as it would appear ready for placement upon the axle of a vehicle;

FIG. 2 is a top plan view of the wheel hub shown in FIG. 1 with portions broken away and shown in cross-section for purposes of illustration;

FIG. 3 is a side elevational view of a lug bolt which is constructed for use with the wheel hub of the present invention; and FIG. 4 is a partial, horizontal cross-sectional view similar to FIG. 2 and illustrating a modified form of the invention.

Referring initially to FIGS. 1 and 2, the wheel hub is designated generally by the numeral 10 and includes an insert 12 formed from a relatively hard material such as steel, and a casting 14 formed from a light-weight material such as aluminum. The steel insert 12 includes a tubular member 16 and a pair of annular sleeves 18 and 20, which are integral with the tubular member 16. The member 16 is of smaller internal diameter than are the sleeves 18 and 20 to present an annular shoulder 22 at each end of the member adjacent the respective sleeves 18 and 20.

The casting 14 which surrounds the insert 12 includes a circumscribing body portion 24 having openings at each end in alignment with the sleeves 18 and 20. The body portion 24 terminates, in the area adjacent the openings, in annular lips 26 and 28 which serve as retainers for the insert 12. Disposed intermediate the ends of the body portion 24 is a circular flange portion 30. It is to be noted that the body portion 24 flares outwardly from each end as it approaches the flange portion 30. The flange portion has a plurality of openings 32 therethrough, which openings are of polygonal configuration for purposes to be made clear hereinafter.

A plurality of gusset plates 34, 36 and 38, each of which is integral with and projects from the body portion 24, are disposed beneath each of the openings 32 to support the flange portion 30. As is best appreciated from viewing the cutaway cross-sectional portion of FIG. 2, each set of three gusset plates, 34, 36 and 38, cooperate with a downwardly projecting rib 40 of the flange portion 30 to form a socket 42 in alignment with a corresponding opening 32. The plates 34, 36 and 38 converge slightly toward the opening 32 to provide the socket 42 with slightly tapered sidewalls.

The wheel hub 10 is normally constructed by placing the insert 12 in an appropriate die and then forming the casting 14 by molding molten aluminum around the insert. Thus, the various components of the casting 14 are an integral unit. The hub 10 is normally telescopically received by the axle of a vehicle, with appropriate bearings being inserted into abutting relationship with the shoulders 22 for assuring minimal friction between the axle and the hub 10.

It is preferable in securing a wheel to the flange portion 30 to utilize lug bolts of the type shown in FIG. 3 and designated by the numeral 44. The bolt 44 has a relatively large square head 46 which is slightly tapered, a square shaft 48, and a threaded shank 50. One of the bolts 44 is inserted through each of the openings 32 with the shank 50 projecting from the flange portion 30 on the side opposite the socket 42. The square shaft 48 is received within the complementally configured opening 32 and the head 46 is received within the complementally configured socket 42.

The polygonal surfaces which form the opening 32 and the socket 42 provide torque transfer surfaces of substantial area for transmitting the torsional forces from a wheel to the hub 10. Since the entire casting 14, including the gusset plates 34, 36 and 38, is an integral unit, the large surface area of the socket 42 in effect transmits the torsional forces over the entire casting. Since the bolts 44 are normally constructed from a relatively hard material such as steel, it is important that the torque transfer surface be maximized to avoid possible damage to the aluminum casting 14. This is accomplished by the relatively large heads 46 and the complemental sockets 42. Thus, even though these forces are of substantial magnitude and would otherwise preclude the use of a material such as aluminum, the construction described above wherein substantial surface area is provided for transmitting the torsional forces makes a material such as aluminum highly satisfactory for the hub 10. The fact that the bolts 44 are constructed of steel and the casting 14 is aluminum precludes the use of crimping or threading to secure the bolts to the casting. Thus the tapered sidewalls of the socket 42 serve to grasp the bolts 44 by a wedging action when the bolts are forced into the sockets 42. This prevents the bolts from falling out when a wheel is removed from the hub 10.

The insert 12 is preferably constructed from a relatively hard material such as steel since this insert comprises the area of the hub 10 which is most subject to wear. The insert 12 can be precision formed prior to pouring the casting 14 thereby eliminating the need for a machining step subsequent to completion of the hub 10. In this regard, it should be noted that when appropriate bearings are in place so that the outer races of the bearings are adjacent the sleeves 18 and 20, which form bearing housings, the shoulders 22 will provide structure for assuring sufficient frictional surfaces between the bearings and the insert 12 to preclude relative movement between these two components.

An alternative form of the invention is shown in FIG. 4 of the drawing and is designated generally by the numeral 110. The wheel hub 110 is identical with the hub 10 described above with the exception of the configuration of the insert 12, which, in the alternative embodiment is designated by the numeral 112. The insert 112 is comprised of a tubular member 116 and a pair of sleeves 118 at opposite ends of the member 116, only one of the sleeves 118 being visible in FIG. 4. As is apparent from viewing this figure, the member 116 and the sleeves 118 are an integral unit with each of the components having equal internal diameters. The sleeves 118 are, however, separated from the member 116 by a plurality of projections 52 which extend inwardly from the member to present interrupted shoulders corresponding to the shoulders 22 of the hub 10. The projections 52 are formed in the insert 112 by dimpling the same prior to molding the casting 14 therearound.

Use of the hub 110 is analogous to use of the wheel hub 10 previously described with the hub again being telescopically received upon an axle and appropriate bearings being disposed within the hub to accommodate relative movement with the axle. The projections 52 retain the bearings in place and preclude relative movement between the hub 110 and the bearings.

Manifestly, the present invention incorporates the many advantages associated with a light-weight material such as aluminum with the strength of a material such as steel in a wheel hub construction which is much lighter and has superior heat dissipation qualities than similar previously known devices.

Having thus described the invention, what is claimed as new and desired to be secured by Letters Patent is:

1. A hub for mounting a wheel on an axle comprising:
    a tubular steel member adapted to be telescopically received by said axle;
    wheel bearing supporting shoulders formed in each end of said member;
    an aluminum casting surrounding and encasing said tubular member and presenting a unitary structure,
    said casting having open end portions in alignment with the bearing supporting shoulders to allow positioning of a wheel bearing within the hub,
    said casting including a body portion and a flange portion circumscribing said body portion and having a plurality of circumferentially spaced openings therein adapted to receive lug bolts for securing a wheel to the hub;
    first and second gusset plates disposed adjacent to and on opposite sides of each of said openings and extending from said opening in the flange portion to the body portion in reinforcing relationship; and
    shoulder means cooperating with said gusset plates to present a socket for closely receiving the head of a lug bolt disposed in a respective opening in torque transmitting relationship therewith,
    one of said opening and said socket being of polygonal configuration for receiving a complementally configured portion of a lug bolt.

2. The invention of claim 1, and a lug bolt disposed in each of said openings, each of said lug bolts having a polygonally-configured portion complementally received by one of said opening and said socket.

3. The invention of claim 1, wherein the sidewalls of each of said sockets converge toward said opening, and said bolt heads are tapered to complement said sidewalls whereby when a bolt is forced into the socket the bolt head is wedged against the sidewalls to secure the bolt to the hub.

* * * * *